April 12, 1966  J. C. PARKS, JR  3,245,250
VAPORIZER FOR A PROCESS GAS ANALYZER
Filed Feb. 26, 1963
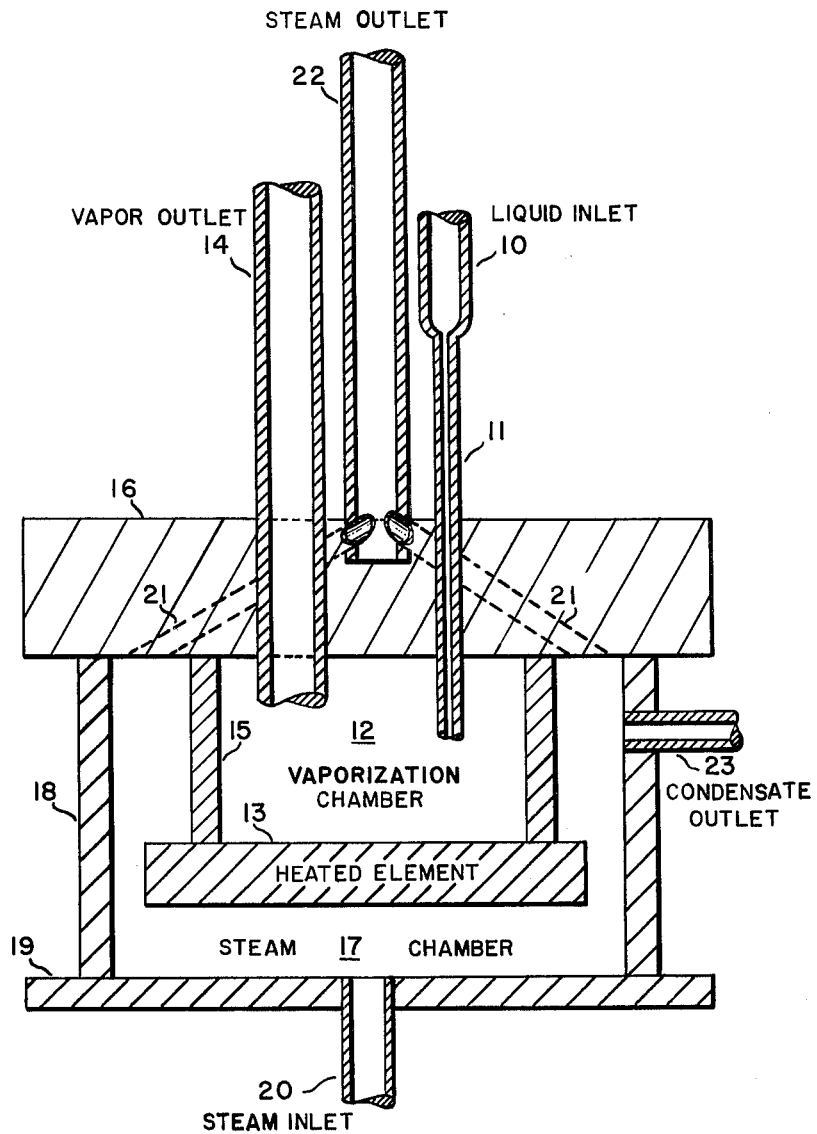
INVENTOR.
James C. Parks, Jr.
BY
ATTORNEY

United States Patent Office 3,245,250
Patented Apr. 12, 1966

3,245,250
VAPORIZER FOR A PROCESS GAS ANALYZER
James C. Parks, Jr., Kemah, Tex., assignor to Monsanto Company, a corporation of Delaware
Filed Feb. 26, 1963, Ser. No. 261,071
3 Claims. (Cl. 73—23)

This invention relates to an improved method and apparatus for effecting process gas analysis. More particularly, this invention relates to a vaporizer means for use with a process gas analyzer.

Many gas analyzers, for example, gas chromatographs, mass spectrometers, infrared analyzers, and ultraviolet analyzers, are known for determining the composition of process streams. These analyzers require a representative sample in vapor or gaseous form. Where the process stream to be analyzed is in liquid form, the stream must be converted into vapor form without concentrating any constituents or impurities of the stream in the sample to be analyzed. Vaporization without concentration of impurities is a particular problem in the analysis of low-boiling liquid streams such as liquid oxygen, ammonia, and vinyl chloride streams.

An object of the present invention is to provide an apparatus for obtaining a representative vapor sample from a liquid process stream for a gas analyzer. Another object of this invention is to provide an apparatus for vaporizing a liquid stream without concentrating minor constituents of said stream. Another object of this invention is to provide an apparatus for vaporizing a liquid stream instantaneously without the formation of vapor-liquid mixtures. Other aspects, objects, and advantages of the invention will be apparent from a study of this disclosure, drawing, and the appended claims.

According to the present invention, there is provided an apparatus and method in combination with a gas analyzer for vaporizing a liquid stream to obtain a representative gas sample for analysis in a gas analyzer, said apparatus comprising a vaporization chamber containing a heated element for substantially instantaneous conversion of said liquid stream into vapor, an inlet means having a flow restriction for the introduction of the liquid stream to be vaporized into said vaporization chamber without flooding of said vaporization chamber or accumulating excess liquid, and an outlet means for withdrawing said vapor from said vaporization chamber for analysis.

The invention is illustrated in the accompanying drawing which is a vertical, sectional view, partially in elevation of one embodiment of this invention.

Referring to the drawing, liquid sample to be vaporized, for example liquid oxygen, is introduced through line 10 and capillary tube 11 into vaporization chamber 12 into contact with heated element 13 to be substantially instantaneously converted into vapor. Capillary tube 11 serves as a flow restriction to prevent the introduction of liquid sample into vaporization chamber 12 at a greater rate than the rate of vaporization of said liquid sample. The vapor is withdrawn from vaporization chamber 12 through line 14 for introduction into the gas analyzer, not shown.

Heated element 13 serves as one wall of vaporization chamber 12 and is circular in shape. The other walls of vaporization chamber 12 are defined by cylindrical walls 15 and circular closure 16. Vaporization chamber 12 is axially arranged within steam chamber 17 composed of cylindrical walls 18, base 19, and circular closure 16. Vaporization chamber 12, more particularly heated element 13, is heated by the introduction of steam into steam chamber 17 through steam inlet line 20 located in base 19 adjacent heated element 13. Uncondensed steam is withdrawn from steam chamber 17 through passages 21 is circular closure 16 and steam outlet 22. Steam condensing in steam chamber 17 is removed through condensate outlet 23 located in cylindrical wall 18.

The flow restriction in liquid inlet line 10 is shown in the drawing as a capillary tube. The flow restriction need not take this form but may be any restriction in the liquid inlet line having an opening smaller in cross-sectional area than the internal dimension of the inlet line. For example, either an orifice or a venturi section may be used in place of the capillary tube as a flow restriction; however, the capillary tube is preferred for this purpose. The size of the opening of the flow restriction is determined by the nature of the liquid sample to be vaporized and the temperature of heated element 13. Thus, the flow restriction must not be so large that the liquid sample enters vaporization chamber 12 at a greater rate than the rate at which the liquid sample is vaporized. Also, the flow restriction must not be so small in opening that any substantial amount of the liquid sample is vaporized at the inlet to the vaporization chamber prior to introduction into the vaporization chamber. The exact dimension for the flow restriction may be readily determined by one skilled in the art; however, a capillary tube size of from 0.01 inch in diameter to about 0.03 inch in diameter with a pressure of from about 1 to 30 p.s.i.g. is generally used.

Heated element 13 is shown in the drawing as one wall of the vaporization chamber. Although this is a preferred embodiment, the heated element need not constitute a wall of the vaporization chamber and may simply be placed within the vaporization chamber out of contact with the walls of the same. Also, the heated element may be the cylindrical wall of the vaporization chamber instead of the circular horizontal base shown in the drawing. The nature of the heated element selected depends to some extent upon the method employed for supplying heat to the element.

In the embodiment shown in the drawing, heated element 13 is heated by the direction of steam onto one surface. If desired, other gases at elevated temperature, such as flue gases, can be used in place of steam. Also, liquids, such as hot water or hot oil, can be used in place of steam for the purpose of raising the temperature of heated element 13. Where the heated element is also one wall of the vaporization chamber, heat may be supplied by the application of gas flames; however, there is a substantial explosion danger in this method of operation where certain liquid streams, such as oxygen, are to be vaporized. If desired, the heated element may also be electrically heated and this method would be required where the heated element is disposed within the vaporization chamber instead of comprising one wall of the same.

The heated element of the vaporization apparatus may be constructed of any of a variety of materials which provide for good heat transfer of the steam or other heat transfer medium to the sample to be vaporized. Examples of materials which may be used include aluminum, stainless steel, carbon steel, and heat resistant plastics such as, for instance, nylon, polypropylene, and tetrafluoroethylene.

The vaporizer apparatus of this invention is particularly useful in the vaporization of liquid oxygen samples for analysis by gas chromatography. Such oxygen streams often contain acetylene as a minor impurity. The apparatus of this invention permits the oxygen to be converted into vapor form in such manner as to obtain a vapor sample which is representative of the liquid sample. Because the sample is vaporized substantially instantaneously, there is no buildup of minor constituents such as acetylene. Also, the opening of the capillary tube of the apparatus is sized so as to prevent any vapor formation in the liquid oxygen inlet. The use of steam to vaporize the liquid oxygen reduces the explosion danger. It will be readily apparent to one skilled in the art that the vaporizer of this invention can also be used to vaporize other low-boiling liquid materials such as liquid ammonia and liquid hydrogen chloride and that moderately high-boiling materials such as liquid hydrocarbons can also be vaporized in this apparatus. It will also be readily apparent to one skilled in the art that the vaporizer apparatus of this invention may be used in combination with other gas analyzers besides the gas chromatograph. For example, this apparatus can be used with the mass spectrometer, the infrared analyzer, and the ultraviolet analyzer. In fact, this vaporizer apparatus may be used with any analyzer requiring a representative vaporized sample for analysis.

The temperature at which the heated element must be maintained can vary over a wide range depending on the liquid sample to be vaporized. Generally, the temperature should be maintained from about 50° C. to about 100° C. although any temperature from about 0° C. to about 200° C. is usually satisfactory.

Reasonable variations and modifications are possible within the scope of the foregoing disclosure, drawing and the appended claims to the invention, the essence of which is that there have been provided a method and apparatus for the conversion of liquid process streams into a representative vapor stream for analysis in a gas analyzer.

What is claimed is:
1. An apparatus for vaporizing a liquid stream to obtain a representative gas sample for analysis in a gas analyzer, said apparatus comprising a vaporization chamber, a heated element located within said vaporization chamber, an inlet flow means for the introduction of said liquid stream to be vaporized into said vaporization chamber without prior partial vaporization into direct contact with said heated element to substantially instantaneously convert said liquid stream into vapor, a flow restriction means within said inlet flow means for preventing flooding of said vaporization chamber with said liquid stream, and an outlet means for withdrawing said vapor from said vaporization chamber for analysis.
2. The apparatus of claim 1 wherein said flow restriction is a capillary tube.
3. The apparatus of claim 1 wherein said heated element comprises one wall of said vaporization chamber.

References Cited by the Examiner
UNITED STATES PATENTS

| | | | |
|---|---|---|---|
| 2,561,506 | 7/1951 | Garretson | 122—40 |
| 2,826,180 | 4/1958 | Lupfer et al. | 122—4 |
| 3,102,512 | 9/1963 | Broerman | 73—23 |

LOUIS R. PRINCE, *Primary Examiner.*

RICHARD C. QUEISSER, *Examiner.*